(12) United States Patent
Tamura et al.

(10) Patent No.: US 8,197,965 B2
(45) Date of Patent: Jun. 12, 2012

(54) ANODE FOR FUEL CELL AND FUEL CELL USING THE SAME

(75) Inventors: Jun Tamura, Yokohama (JP); Yoshihiko Nakano, Yokohama (JP); Wu Mei, Yokohama (JP); Taishi Fukazawa, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 876 days.

(21) Appl. No.: 12/201,332

(22) Filed: Aug. 29, 2008

(65) Prior Publication Data

US 2009/0061276 A1 Mar. 5, 2009

(30) Foreign Application Priority Data

Aug. 31, 2007 (JP) ................................. 2007-225853

(51) Int. Cl.
*H01M 4/02* (2006.01)
*H01M 4/90* (2006.01)
*H01M 4/92* (2006.01)

(52) U.S. Cl. ........ 429/209; 429/523; 429/524; 429/526; 429/527; 429/528

(58) Field of Classification Search .................. 429/523, 429/524, 526, 527, 528, 209; 204/192.12; 427/115; 502/101
See application file for complete search history.

(56) References Cited

U.S. PATENT DOCUMENTS

| | | | | |
|---|---|---|---|---|
| 3,506,494 | A | 4/1970 | Adlhart | 429/442 |
| 7,727,930 | B2 * | 6/2010 | Mei et al. | 502/326 |
| 7,846,862 | B2 * | 12/2010 | Mei et al. | 502/300 |
| 7,931,935 | B2 * | 4/2011 | Yamamoto et al. | 427/115 |
| 2006/0019148 | A1 * | 1/2006 | Tamura et al. | 429/44 |
| 2007/0082257 | A1 * | 4/2007 | Tamura et al. | 429/45 |
| 2007/0087258 | A1 * | 4/2007 | Mei et al. | 429/40 |
| 2007/0166600 | A1 * | 7/2007 | Kang | 429/42 |
| 2007/0178363 | A1 * | 8/2007 | Fujiwara et al. | 429/44 |
| 2007/0212591 | A1 * | 9/2007 | Miyazaki et al. | 429/40 |
| 2007/0254806 | A1 | 11/2007 | Mei et al. | 502/325 |
| 2008/0230171 | A1 | 9/2008 | Mei et al. | 156/150 |
| 2008/0233465 | A1 | 9/2008 | Mizutani et al. | 429/431 |
| 2008/0241639 | A1 | 10/2008 | Mei et al. | 429/499 |
| 2008/0254974 | A1 | 10/2008 | Nakano et al. | 502/202 |

(Continued)

FOREIGN PATENT DOCUMENTS

CN 1953253 A 4/2007

(Continued)

OTHER PUBLICATIONS

U.S. Appl. No. 12/302,949, filed Dec. 1, 2008, Tamura, et al.

(Continued)

*Primary Examiner* — Helene Klemanski
(74) *Attorney, Agent, or Firm* — Oblon, Spivak, McClelland, Maier & Neustadt, L.L.P.

(57) ABSTRACT

This invention provides an anode for a fuel cell which can realize stable output for a long period of time, and a fuel cell using the anode for a fuel cell. The anode for a fuel cell comprises an electrode catalyst layer, the electrode catalyst layer comprising a supported catalyst comprising an electroconductive carrier material and catalyst fine particles supported on the electroconductive carrier material, a proton conductive inorganic oxide, and a proton conductive organic polymer binder, the weight ratio between the supported catalyst (C) and the proton conductive inorganic oxide (SA), $W_{SA}/W_C$, being 0.06 to 0.38, the weight ratio between the proton conductive inorganic oxide (SA) and the proton conductive organic polymer binder (P), $W_P/W_{SA}$, being 0.125 to 0.5.

18 Claims, 1 Drawing Sheet

U.S. PATENT DOCUMENTS

2009/0325021 A1* 12/2009 Tamura et al. .................. 429/30
2010/0003566 A1* 1/2010 Tamura et al. .................. 429/30

FOREIGN PATENT DOCUMENTS

| CN | 1977410 A | 6/2007 |
|----|-----------|--------|
| JP | 2004-281177 | 10/2004 |
| JP | 2005-259557 | 9/2005 |
| JP | 2007-111582 | 5/2007 |
| WO | WO 2006/004023 A1 | 1/2006 |

OTHER PUBLICATIONS

U.S. Appl. No. 12/372,135, filed Feb. 17, 2009, Tamura, et al.
Office Action issued Jun. 9, 2010, in Chines Patent Application No. 200810212455.4.

* cited by examiner

ANODE FOR FUEL CELL AND FUEL CELL USING THE SAME

CROSS-REFERENCE TO RELATED APPLICATIONS

This application is based upon and claims the benefit of priority from the prior Japanese Patent Applications No. 225853/2007, filed on Aug. 31, 2007; the entire contents of which are incorporated herein by reference.

BACKGROUND OF THE INVENTION

1. Field of the Invention

The present invention relates to an anode for a fuel cell and a fuel cell using the same.

2. Background Art

Solid polymer fuel cells, particularly solid polymer fuel cells using an aqueous methanol solution as a fuel, can be operated at a low temperature and can realize a reduction in size and weight and thus have recently been energetically studied as a power supply, for example, for mobile devices. However, the performance of the conventional fuel cell does not reach a level which can realize spread use of the fuel cell. In the fuel cell, chemical energy is converted to electric power by a catalytic reaction in an electrode, and, thus, the use of a highly active catalyst is indispensable for the development of a high-performance fuel cell.

PtRu has generally been used as an anode catalyst for fuel cells. In this case, the voltage loss caused by the PtRu catalyst is about 0.3 V with respect to a theoretical voltage of 1.21 V obtained by a catalytic reaction of the electrode. This has led to a demand for an anode catalyst having a higher activity (methanol oxidation activity) than PtRu. In order to improve the methanol oxidation activity, various methods such as the addition of other element(s) to PtRu have been traditionally studied and reported.

For example, U.S. Pat. No. 3,506,494 filed in 1966 refers to the effect attained by the addition of 10 types of metals such as tungsten, tantalum, and niobium. However, the reaction field of the catalyst reaction is on the surface of the nano-size catalyst fine particle, and the layer having a thickness of a few atoms on the catalyst surface greatly affects the catalytic activity. Accordingly, there is a possibility that, even in the case of an identical catalyst composition, the state of the catalyst surface varies depending upon the synthesis process.

For example, JP-A 2005-259557 (KOKAI) is directed to a process for producing an anode catalyst by adding group 4 to 6 metals of the periodic table to platinum (Pt) and ruthenium (Ru) by an immersion method. JP-A 2005-259557 (KOKAI) describes that the methanol activity greatly varies depending upon the order of immersion. Regarding the mixing ratio among platinum, ruthenium and the group 4 to 6 metal, this document describes only that platinum:ruthenium:additive metal weight ratio=317.7:82.3:100.

It is considered that there is a high possibility that a highly active catalyst having higher activity than PtRu can be provided by regulating the synthesis process to synthesize catalyst fine particles having a nano structure which could not have hitherto been realized. Up to now, a solution method such as an immersion method has been generally used for catalyst synthesis. The solution method, however, involves a problem that catalyst structure regulation and surface regulation are difficult for elements which are difficult to be reduced and elements which are difficult to be alloyed. The present inventor has found that the addition of a small amount of tin to PtRu can improve methanol oxidation activity (JP-A 2004-281177 (KOKAI)). However, a further improvement in methanol oxidation activity by improving the process has been desired.

The synthesis of the catalyst by sputtering or vapor deposition is advantageous from the viewpoint of material regulation. However, a few studies on the influence of the type of elements, catalyst composition, substrate material, substrate temperature and the like on the process have been made.

JP-A 2004-281177 (KOKAI) reports the effect attained by the addition of tin or tungsten to a PtRu alloy in the formation of a catalyst on a gold foil or a silicon (Si) substrate by sputtering. However, there is room for improvement in methanol oxidation activity. In JP-A 2004-281177 (KOKAI), there is no description on the effect attained by the addition of elements other than tin or tungsten. Regarding the effect attained by the addition of tin, only the effect in the case where the content of tin in the catalyst layer is 25% is reported.

As described above, studies on an improvement in activity by the addition of other elements to PtRu have been energetically made. This method, however, suffers from a problem that, under acidic conditions, the added metal is disadvantageously eluted. A perfluorosulfonic acid polymer (for example, Nafion (tradename) manufactured by Du Pont) is generally used as a proton conductive organic polymer binder in the electrode catalyst layer. Upon the contact of the perfluorosulfonic acid polymer with the catalyst, the metal added to PtRu is eluted resulting in deteriorated activity. As a result, power generation which is stable for a long period of time becomes difficult. Reducing the amount of the perfluorosulfonic acid polymer used in the catalyst layer is necessary for reducing the elution of the metal from the catalyst. The reduction in amount of the perfluorosulfonic acid polymer, however, involves a problem that the proton conductivity is lowered making it impossible to realize high output.

The present inventors have proposed in JP-A 2006-32287 (KOKAI), for example, an electrode for a fuel cell, comprising an oxide carrier such as titanium, particles of an oxide of tungsten or the like, and a binder for binding them. In the electrode catalyst layer produced by combining an oxide (an oxide superacid) of titanium, tungsten or the like, a PtRu catalyst, and a binder, the continuity between the oxide superacids and the continuity between the PtRu catalyst carrier materials are considered to be hindered by the binder. Further, the deposition of the binder on the surface of the oxide superacid and the redox catalyst is expected to cause a problem that water necessary for the generation of protons is not satisfactorily supplied to the oxide superacid or that the fuel is not satisfactorily supplied to the redox catalyst. As a result, it is considered that a three-phase interface at which an electrode reaction takes place is unsatisfactory.

SUMMARY OF THE INVENTION

The present invention is directed to an anode for a fuel cell comprising an electrode catalyst layer, the electrode catalyst layer comprising a PtRu catalyst to which other element(s) have been added, an oxide superacid formed of an oxide of titanium, tungsten or the like as a proton conductive inorganic oxide, and a perfluorosulfonic acid polymer as a proton conductive organic polymer binder, which fuel cell can reduce a catalyst deterioration without sacrificing the proton conductivity of the catalyst layer by using a proton conductive organic polymer binder in a smaller amount than that in the prior art.

According to the present invention, there is provided an anode for a fuel cell, comprising an electrode catalyst layer, the electrode catalyst layer comprising:

a supported catalyst comprising an electroconductive carrier material and catalyst fine particles supported on the electroconductive carrier material;

a proton conductive inorganic oxide; and a proton conductive organic polymer binder;

the weight ratio between the supported catalyst (C) and the proton conductive inorganic oxide (SA), $W_{SA}/W_C$, being 0.06 to 0.38, the weight ratio between the proton conductive inorganic oxide (SA) and the proton conductive organic polymer binder (P), $W_P/W_{SA}$, being 0.125 to 0.5.

According to the present invention, there is also provided a membrane electrode assembly comprising a fuel electrode, an oxidizing agent electrode, and an electrolyte membrane disposed between the fuel electrode and the oxidizing agent electrode, wherein the fuel electrode comprises a catalyst layer, and the catalyst layer comprises:

a supported catalyst comprising an electroconductive carrier material and catalyst fine particles supported on the electroconductive carrier material;

a proton conductive inorganic oxide; and a proton conductive organic polymer binder;

the weight ratio between the supported catalyst (C) and the proton conductive inorganic oxide (SA), $W_{SA}/W_C$, being 0.06 to 0.38, the weight ratio between the proton conductive inorganic oxide (SA) and the proton conductive organic polymer binder (P), $W_P/W_{SA}$, being 0.125 to 0.5.

According to the present invention, there is further provided a fuel cell comprising a fuel electrode, an oxidizing agent electrode, and an electrolyte membrane disposed between the fuel electrode and the oxidizing agent electrode, wherein the fuel electrode comprises a catalyst layer, and the catalyst layer comprises:

a supported catalyst comprising an electroconductive carrier material and catalyst fine particles supported on the electroconductive carrier material;

a proton conductive inorganic oxide; and a proton conductive organic polymer binder;

the weight ratio between the supported catalyst (C) and the proton conductive inorganic oxide (SA), $W_{SA}/W_C$, being 0.06 to 0.38, the weight ratio between the proton conductive inorganic oxide (SA) and the proton conductive organic polymer binder (P), $W_P/W_{SA}$, being 0.125 to 0.5.

According to the present invention, there is further provided a process for producing a supported catalyst for a fuel cell, comprising providing catalyst fine particles on an electroconductive carrier held at 400° C. or below by sputtering or vapor deposition.

An object of the present invention is to provide an electrode for a fuel cell, which can realize stable output for a long period of time, a membrane electrode assembly, and a fuel cell.

DETAILED DESCRIPTION OF THE INVENTION

The present inventors have made extensive and intensive studies on the relationship between the long-term stability of the catalyst and the proton conductor with a view to attaining the above object of the present invention. As a result, the present inventors have found that the combined use of a proton conductive inorganic oxide and a proton conductive organic polymer binder in a smaller amount than that in the prior art can reduce a deterioration in a PtRu catalyst to which other element has been added without sacrificing a deterioration in proton conductivity of the catalyst layer.

Embodiments of the present invention will be described.

At the outset, the anode catalyst for a fuel cell according to the present invention will be described.

The anode catalyst for a fuel cell according to the present invention comprises an electroconductive carrier and a supported catalyst formed of catalyst fine particles supported on the electroconductive carrier. The catalyst fine particles can be selected from arbitrary anode catalysts for a fuel cell. Preferably, however, the catalyst fine particles are represented by general formula (1) or (2).

One of preferred compositions of the catalyst fine particle is represented by general formula (1).

$$Pt_xRu_yT_z \qquad (1)$$

wherein element T is at least one element selected from the group consisting of vanadium (V), niobium (Nb), and hafnium (Hf); and x is 30 to 60 at. %, y is 20 to 50 at. %, and z is 5 to 50 at. %.

In the catalyst fine particle represented by general formula (1), platinum and ruthenium are main catalyst elements. Platinum is very effective for oxidation of hydrogen and a dehydrogenation reaction of an organic fuel, and ruthenium is very effective for CO poisoning suppression. When the ruthenium content is excessively low, the catalytic activity is sometimes unsatisfactory. Accordingly, x and y preferably fall within the above-defined range.

Element T is a co-catalyst. The present invention has been made based on finding that high activity can be realized by adding at least one element selected from vanadium, niobium, and hafnium to platinum and ruthenium. The reason why high activity can be realized has not been fully elucidated yet but is believed to mainly reside in the surface structure or electron state of the catalyst attributable to a specific mixed state of individual elements. It is particularly considered that the presence of a metallic bond between element T and platinum or ruthenium is important. When catalyst fine particles are synthesized by a solution method, a reduction reaction of vanadium, niobium, hafnium or the like is less likely to take place and alloying of these elements with platinum and ruthenium is less likely to proceed. Accordingly, most of the resultant catalyst fine particles are a mixture of PtRu fine particles with fine particles of an oxide of element T. The analysis of the surface of the catalyst fine particles, which have been synthesized by the solution method, by X-ray photoelectron spectroscopy (XPS) shows that most of the element T is bonded to other element by an oxygen bond. On the other hand, preferably, the catalyst fine particles used in the present invention are produced, for example, by sputtering or vapor deposition which will be described later. In the catalyst fine particles produced by this method, element T having a metal bonded state is present, and the area of a peak attributable to a metallic bond of element T in a spectrum measured by X-ray photoelectron spectroscopy is not less than 20% of the area of a peak attributable to an oxygen bond of element T. Photoelectrons (signals) which can be detected by XPS measurement are limited to those present in a depth of approximately a few nanometers near the sample surface. Accordingly, it is considered that element T in a metal state is present in a region within a few nanometers from the surface of the catalyst fine particles according to the present invention. Further, since the metal nanoparticle consisting of element T alone cannot be stably present in the air, it is considered that, in the catalyst fine particles according to the present invention, particles of an alloy of element T with platinum and ruthenium are present. A very high proportion of the total signal intensity detected by the XPS measurement is accounted for by a part near the surface. Therefore, when an oxide layer is formed on the surface of the catalyst fine particle, the peak area (signal) attributable to an oxidative bond of element T in an XPS spectrum is highly likely to be higher than the metallic bond-derived peak area. The presence of the metallic bond of element T in the catalyst fine particle used in the present invention can also be confirmed by extended x-ray absorption fine structure measurement (EXAFS). In the EXAFS, X-ray is transmitted through the whole catalyst, and, thus, as with XRD (X-ray diffractometry), information on binding of the whole catalyst fine particle can be read. A peak (bond distance: 2 to 3 angstroms) attributable to the metallic bond of the element T is observed in a radial structure distribution of each element T measured by EXAFS. On the other hand, in the catalyst fine particles synthesized by the solution method, a strong peak (bond distance: <2 angstroms) derived from an oxygen bond of element T is observed, and the metallic bond-derived peak is hardly observed. As a result of the analysis of an XRD spectrum of catalyst fine particles used in the present invention by XRD (X-ray diffractometry), the position of the main peak is different from that for the PtRu alloy, suggesting that the addition of element T has resulted in a change in alloy structure. Preferably, the spacing between crystal faces, which exhibit a main peak of the catalyst fine particle used in the present invention, is 2.16 to 2.25 angstroms. The composition of the catalyst and the production process are important for providing a highly active specific mixed state of composed of platinum, ruthenium and element T.

In the catalyst fine particle, the element T content z is preferably 5 to 50 at.%. When the element T content z is less than 5 at.%, the cocatalytic activity of the element T is considered to be low. When the element T is contained in a large amount of more than 50 at. %, the number of main active sites constituted by platinum and ruthenium atoms is reduced, possibly leading to lowered catalytic activity. The element T content z more preferably falls within the range of 10 to 35 at.%.

In some cases, the replacement of a part of PtRu with other metal improves the activity.

When the above other metal is used, rhodium (Rh), osmium (Os), or iridium (Ir) is preferred because noble metals are highly chemically stable. Further, in some cases, the addition of other metallic element, particularly at least one metallic element selected from the group consisting of tungsten (W), nickel (Ni), molybdenum (Mo), tantalum (Ta), titanium (Ti), zirconium (Zr), chromium (Cr), and cobalt (Co) to the catalyst fine particle represented by formula (1) improves the activity. The addition amount is preferably 5 to 30 at. %.

Another preferred composition of the catalyst fine particle is represented by general formula (2).

$$Pt_xRu_yM_zSn_u \quad (2)$$

wherein element M is at least one element selected from the group consisting of vanadium (V), niobium (Nb), hafnium (Hf), and tungsten (W); and x is 30 to 60 at. %, y is 20 to 50 at. %, z is 5 to 50 at. %, and u is 0.5 to 12 at. %.

In the present invention, the methanol oxidation activity has been further improved by adding tin and element M (at least one element selected from vanadium, niobium, hafnium, and tungsten) to PtRu. Preferably, the content of tin in the catalyst fine particle represented by formula (2), that is, u, is 0.5 to 12 at. %. When the tin content is less than 0.5 at. % or more than 12 at. %, in some cases, satisfactory cocatalytic activity of tin cannot be provided. The tin content is more preferably 1 to 10 at. %.

In the present invention, element M in a metal bonded state is present in the catalyst fine particle using tin and element M, and the area of a metallic bond-derived peak of element M in an XPS spectrum is not less than 20% of the area of an oxygen bond-derived peak of element M. It is considered that element M is present in a metal state in a region within a few nanometers from the surface of the catalyst fine particle. Further, the metallic nanoparticle consisting of element M alone cannot stably exist in the air, and, thus, it is considered that particles of an alloy of element M with platinum and ruthenium is present in the supported catalyst in the present invention. As a result of the analysis of an XRD spectrum of the catalyst fine particle by XRD (X-ray diffractometry), the position of the main peak is different from that for the PtRu alloy, and, thus, it is considered that the addition of element M has resulted in a change in the alloy structure. The spacing between crystal faces, which exhibit a main peak in an X-ray diffraction pattern of the catalyst fine particle, is preferably 2.16 to 2.25 angstroms. The composition of the catalyst and the production process are important for providing a highly active specific mixed state of composed of platinum, ruthenium and element M.

The catalyst fine particle represented by formula (2) may contain at least one noble metal element selected from the group consisting of rhodium (Rh), osmium (Os), iridium (Ir), and nickel (Ni). The content t of the noble metal element is preferably not more than 25 at. % from the viewpoint of attaining the effect of improving the catalytic activity.

The catalytic activity is sometimes improved by adding other metallic element(s), particularly at least one metal selected from the group consisting of molybdenum (Mo), tantalum (Ta), titanium (Ti), zirconium (Zr), chromium (Cr), and cobalt (Co), to the catalyst fine particle represented by formula (2). When such metals are added, the addition amount thereof is preferably 5 to 30 at. %.

The supported catalyst used in the present invention may contain oxygen. The oxidation of the surface of the supported catalyst takes place by oxygen adsorption on the surface of the supported catalyst during the synthesis process or in the storage of the supported catalyst. Further, the oxidation of the supported catalyst surface takes place upon surface oxidation treatment such as acid pickling. When there is a minor level of oxidation on the surface of the supported catalyst, in some cases, the power output and stability are improved. The oxygen content of the supported catalyst is preferably not more than 25 at. %. When the oxygen content exceeds 25 at. %, the catalytic activity is sometimes significantly deteriorated.

The catalyst fine particles used in the present invention is preferably in the form of nano-size fine particles because the highest activity can be provided. The average particle diameter of the catalyst fine particles is preferably not more than 10 nm. This is because, when the average particle diameter exceeds 10 nm, there is possibility that the activity efficiency of the catalyst is significantly deteriorated. The average particle diameter of the catalyst fine particles is more preferably in the range of 0.5 to 10 nm. When the average particle diameter of the catalyst fine particles is less than 0.5 nm, the control of the catalyst synthesis process is difficult, and the cost of the catalyst synthesis is increased. Regarding the catalyst fine particles, fine particles having an average particle diameter of not more than 10 nm as such may be used. Aggregates (secondary particles) of primary particles formed of the fine particles may also be used. The average particle diameter of the catalyst fine particles is a value determined from the half-value width of the peak as measured by XRD.

Carbon black may be mentioned as an example of the electroconductive carrier. The electroconductive carrier, however, is not limited to carbon black only, and any material may be used so far as the material has satisfactory electroconductivity and stability as a carrier. In recent years, nanocarbon materials, for example, fiber-, tube-, and coil-shaped materials, have been developed. These nanocarbon materials are different in surface state. Accordingly, when the catalyst fine particles according to the present invention are supported on these nanocarbon materials, a further improvement in activity can be possibly realized. In addition to carbon materials, for example, electroconductive ceramic materials may be used as the carrier. In this case, further, the synergistic effect of the ceramic carrier and the catalyst fine particles can be expected.

Next, the production process of the supported catalyst according to the present invention will be described. The supported catalyst according to the present invention is produced, for example, by sputtering or vapor deposition. These methods are advantageous in that, as compared with solution methods such as an impregnation method, a precipitation method, or a colloid method, catalysts having a specific mixed state having a metallic bond can be more easily produced. The production of the supported catalyst according to the present invention by the conventional solution method is difficult. Polynuclear complexes cannot be synthesized without difficulties by a method comprising producing a polynuclear complex of platinum or ruthenium with element T having a metallic bond, impregnating a carrier with the polynuclear complex, and reducing the assembly. Accordingly, the production of the supported catalyst according to the present invention by this method is difficult.

Further, according to the above method, the production cost is expected to be high. The supported catalyst used in the present invention can also be produced by electrodeposition or electrophoresis. In these methods, however, the regulation of particles to form nanoparticles is difficult, and, further, the production cost is expected to be high.

A method for depositing catalyst fine particles on an electroconductive carrier by sputtering will be described. At the outset, a particulate or fibrous electroconductive carrier is satisfactorily dispersed. Next, the dispersed carrier is placed in a holder provided in a chamber in a sputtering apparatus, and, with stirring of the electroconductive carrier, catalyst constituent metals are deposited onto the carrier by sputtering. An alloy target may be used as the target material. Alternatively, simultaneous sputtering of two or more metals may be used. The temperature of the carrier during sputtering is preferably brought to 400° C. or below. When the temperature is above 400° C., phase separation occurs in the catalyst fine particles and, consequently, the catalytic activity sometimes becomes unstable. Further, in order to reduce the cost necessary for cooling of the carrier, the lower limit of the carrier temperature is preferably brought to 10° C. The carrier temperature can be measured with a thermocouple. Stirring is preferably is important from the viewpoint of realizing homogeneous catalyst deposition. When stirring is not carried out, uneven distribution of the catalyst is likely to occur and, consequently, in many cases, there is a possibility that fuel cell characteristics are deteriorated.

The supported catalyst of the present invention may be produced by sputtering directly on an electroconductive carbon fiber-containing porous paper, electrode diffusion layer, or electrolyte membrane. In this case, the catalyst should be formed in a nano fine particle state by regulating the process. Further, in the same manner as described above, the temperature of the porous paper or the like is preferably brought to 400° C. or below. After the formation of the catalyst fine particles by sputtering or vapor deposition, acid pickling treatment or heat treatment sometimes can sometimes realize a further improvement in activity. This is probably because the catalyst structure or surface structure is further rendered proper by the acid pickling treatment or heat treatment. In the acid pickling treatment, any aqueous acid solution may be used. An example of a preferred aqueous acid solution is an aqueous sulfuric acid solution. Post heat treatment is preferably carried out at 10 to 400° C. or below in an atmosphere having an oxygen partial pressure of less than 5%. In order to facilitate the formation of fine particles, other material such as carbon and constituent metallic elements may be simultaneously sputtered or vapor deposited. In the present invention, metals having good dissolubility, for example, copper (Cu) and zinc (Zn), and constituent metallic elements can be simultaneously sputtered or vapor deposited followed by acid pickling or the like to remove the copper, zinc and the like.

Next, the proton conductive inorganic oxide according to the present invention will be described.

The proton conductive inorganic oxide comprises an oxide carrier containing element Y which is at least one element selected from the group consisting of titanium (Ti), zirconium (Zr), silicon (Si), aluminum (Al), tin (Sn), hafnium (Hf), germanium (Ge), gallium (Ga), indium (In), cerium (Ce), and niobium (Nb), and an oxide particle supported on the surface of the oxide carrier and containing element X which is at least one element selected from the group consisting of tungsten (W), molybdenum (Mo), chromium (Cr), boron (B), and vanadium (V) (hereinafter referred to as "proton conductive inorganic oxide containing elements X and Y").

An accurate proton conduction mechanism in the proton conductive inorganic oxide containing elements X and Y has not been fully elucidated yet but is believed to be as follows. Specifically, when an oxide particle containing element X (hereinafter referred to as "oxide particle A") is supported on the surface of an oxide carrier containing element Y (hereinafter referred to as "oxide carrier B"), a Lewis acid site is produced within the structure of the oxide carrier B. Upon hydration of the Lewis acid site, a Broensted acid site is formed, and a proton conduction field is formed. When the proton conductive inorganic oxide has an amorphous structure, the amorphous structure is also considered to contribute to the promotion of production of the Lewis acid site.

In addition to the proton production reaction of the Lewis acid site, the number of molecules of entrained water necessary for proton transfer can be reduced. Therefore, a high level of proton conductivity can realized by a small amount of water molecules present on the surface of the proton conductive inorganic oxide. As a result, a high level of electric power generation can be realized without close water control during power generation.

Accordingly, the cell resistance can be lowered by incorporating the proton conductive inorganic oxide in at least any one of a fuel electrode, an oxidizing agent electrode, and an electrolyte membrane, and, thus, the maximum level of electric power generation of the fuel cell can be increased.

Some oxide particle A is soluble in water although the solubility varies depending upon the type of element and pH conditions. Since, however, oxide particle A is supported on oxide carrier B having low water solubility, the dissolution of oxide particle A in water can be suppressed and the stability of the proton conductive inorganic oxide against water and the liquid fuel can be enhanced. Further, the contamination of other fuel cell materials or devices with ions of eluted oxide particle A can also be avoided. Therefore, according to the present invention, high long-term reliability can be realized in fuel cells. Further, the adoption of inexpensive oxide carrier B as a base material can reduce the production cost of the fuel cell.

That oxide particle A is supported on oxide carrier B can be confirmed, for example, by an instrumental analysis such as X-ray diffractormetry (XRD) or X-ray photoelectron spectroscopy (XPS).

Oxide carrier B can be synthesized, for example, by a vapor phase method in which a gas containing element Y is decomposed to produce an oxide, or a sol-gel method using a metal alkoxide containing element Y as a starting material. The synthesis method, however, is not limited these methods only. Specific examples of oxides include $TiO_2$, $ZrO_2$, $SiO_2$, $Al_2O_3$, $SnO_2$, $HfO_2$, $GeO_2$, $Ga_2O_3$, $In_2O_3$, $CeO_2$, and $Nb_2O_5$. The oxide may also be a composite oxide containing a plurality of types of metallic elements.

Among them, $SnO_2$ is preferred from the viewpoint of satisfactorily enhancing proton conductivity. Further, the use of $TiO_2$ is preferred from the viewpoint of realizing a high level of proton conductivity while suppressing the production cost. The oxide carrier B may be, for example, in a particulate, fibrous, flat plate, layer, or porous form. The shape of oxide carrier B, however, is not limited to these shapes only.

A preferred method for supporting oxide particle A on the surface of oxide carrier B comprises dispersing oxide carrier B in a solution containing an element X-containing material dissolved therein, for example, an aqueous solution of chloride, nitrate, hydroacid, oxoacid salts or the like, or an alcohol solution of a metal alkoxide, removing the solvent to support oxide carrier B, and heat treating the assembly. The supporting method, however, is not limited to this method only. For example, oxide particle A may be supported in the form of composite oxide containing a plurality of types of elements. Supporting oxide particle A on at least a part of the surface of oxide carrier B suffices for contemplated results. For example, oxide particle A may be interspersed on the surface of oxide carrier B, or may be present as a layer covering the surface of oxide carrier B. Further, supporting oxide particle A on the surface of oxide carrier B suffices for contemplated results, and the crystallinity of the oxide particle A or oxide carrier B is not limited. However, both oxide particle A and oxide carrier B are preferably amorphous from the viewpoints of possible contribution of the promotion of Lewis acid site production and improved acidity, lowered production cost, and easiness of production process. More preferably, oxide particle A is amorphous while oxide carrier B is crystalline. In this connection, however, it should be noted that a combination of crystalline oxide particle A with crystalline oxide carrier B and a combination of crystalline oxide particle A with amorphous oxide carrier B are also possible.

As described above, in order that the surface of the proton conductive inorganic oxide functions as a proton conduction field, the specific surface area of the proton conductive inorganic oxide is preferably as large as possible. The specific surface area is preferably in the range of 10 to 2000 m²/g, because, when the specific surface area is more than 2000 m²/g, the handling and the regulation of uniform synthesis are difficult while, when the specific surface area is less than 10 m²/g, there is a possibility that satisfactory proton conductivity cannot be provided.

Regarding oxide particle A to be supported on oxide carrier B, the element ratio between element Y in oxide carrier B and element X in oxide particle A, i.e., X/Y, is less than 0.0001, the amount of oxide particle A supported on oxide carrier B is so small that the amount of the proton conduction field is small and the proton conductivity is likely to be lowered. On the other hand, when the element ratio (X/Y) exceeds 5, the amount of oxide particle A supported on oxide carrier B is so large that the element X-containing oxide particle A disadvantageously covers the proton conduction field, possibly leading to lowered proton conductivity. For the above reason, the element ratio between element Y in oxide carrier B and element X in oxide particle A, i.e., X/Y, is preferably 0.0001 to 5, more preferably 0.01 to 1.

The proton conductive inorganic oxide used in the present invention is provided, for example, by supporting an oxide particle A precursor on an oxide carrier B and then heat treating the assembly in an oxidizing atmosphere, for example, in the air.

When the treatment temperature is below 200° C., a satisfactory chemical bond is not formed between oxide carrier B and oxide particle A. Accordingly, in this case, the resultant oxide is likely to have lowered proton conductivity. On the other hand, when the treatment temperature is high and above 1000° C., fusing takes place between particles resulting in reduced specific surface area. Accordingly, in this case, a high level of proton conductivity cannot be possibly provided. The heat treatment temperature is preferably 200 to 1000° C., more preferably 400 to 800° C. When the heat treatment temperature is below 200° C., due to the excessively low temperature, a bond is less likely to be formed between oxide carrier B and oxide particle A. Therefore, in this case, the heat treatment time should be long. When the heat treatment temperature is high and around 1000° C., the bond can easily be formed and, thus, the contemplated synthesis by heat treatment in a short time can be realized.

The proton conductive inorganic oxide preferably has solid superstrong acidity. The degree of dissociation of protons can be expressed as acid strength, and the acid strength of the solid acid is expressed as Hammett acidity function $H_0$. In the case of sulfuric acid, $H_0$ is −11.93. More preferably, the proton conductive inorganic oxide exhibits a solid superstrong acidity of $H_0$<−11.93. In the oxide superstrong acid in the present invention, the acidity can be enhanced to $H_0$=−20.00 by optimizing the synthesis method. Accordingly, the acid strength of the oxide superstrong acid is preferably in the range of −20.00<$H_0$<−11.93. The acidity of the solid superstrong acid can be evaluated by a color reaction with an indicator. The measurement is carried out by a method in which an acid indicator such as m-nitrotoluene (pKa=−11.99), p-nitrofluorobenzene (pKa=−12.40), p-nitrochlorobenzene (pKa=−12.70), m-nitrochlorobenzene (pKa=−13.16), 2,4-dinitrotoluene (pKa=−13.75), 2,4-dinitrofluorobenzene (pKa=−14.52), or 1,3,5-trinitrobenzene (pKa=−16.04) is used to observe a color change of the indicator which has been adsorbed by a reaction on the surface of the solid superstrong acid. When the oxide superstrong acid is in a colored state as in $SnO_2$, the evaluation of solid acidity based on a color change in an acid indicator is difficult. In such a case, the solid superstrong acidity can also be measured by an ammonia thermal desorption method (TPD). In this method, an ammonia gas is adsorbed on a solid acid sample, and the temperature of the sample is raised to detect the amount of desorbed ammonia and desorption temperature followed by analysis to determine the solid superstrong acidity.

Next, the proton conductive organic polymer binder according to the present invention will be described.

The proton conductive organic polymer binder is preferably a sulfonic acid group-containing organic polymer material from the viewpoint of the level of proton conductivity.

Examples thereof include sulfonic acid group-containing fluororesins, for example, Nafion (tradename: manufactured by Du Pont), Flemion (tradename: manufactured by Asahi Kasei Corporation), and Aciplex (tradename: manufactured by Asahi Glass Co., Ltd.). However, the proton conductive organic polymer binder is not particularly limited so far as the material is a sulfonic acid group-containing organic polymer material.

In one embodiment of the present invention, the anode for a fuel cell according to the present invention comprises an electrode catalyst layer comprising a supported catalyst, a proton conductive inorganic oxide, and a proton conductive organic polymer binder, the supported catalyst comprising the above electroconductive carrier and catalyst fine particles supported on the electroconductive carrier.

In the present invention, the weight ratio between the supported catalyst (C) and the proton conductive inorganic oxide (SA), $W_{SA}/W_C$, should be 0.06 to 0.38, and the weight ratio between the proton conductive inorganic oxide (SA) and the proton conductive organic polymer binder (P), $W_P/W_{SA}$, should be 0.125 to 0.5. When the $W_{SA}/W_C$ value is less than 0.06, the proton conductivity is lowered and the power output is lowered. When the $W_{SA}/W_C$ value is more than 0.38, the electron conductivity is lowered and the power output is lowered. On the other hand, when the $W_P/W_{SA}$ value is less than 0.125, the proton conductivity is lowered and the power output is lowered. When the $W_P/W_{SA}$ value is more than 0.5, catalyst deterioration is significant. The fact that the properties of the fuel cell can be significantly improved by optimizing the weight ratio between the supported catalyst, the proton conductive inorganic oxide, and the proton conductive organic polymer binder has not hitherto been known in the art.

The membrane electrode assembly in an embodiment of the present invention comprises an anode, a cathode, and a proton conductive film disposed between the anode and the cathode. The fuel cell in an embodiment of the present invention comprises the membrane electrode assembly.

Figure 1:
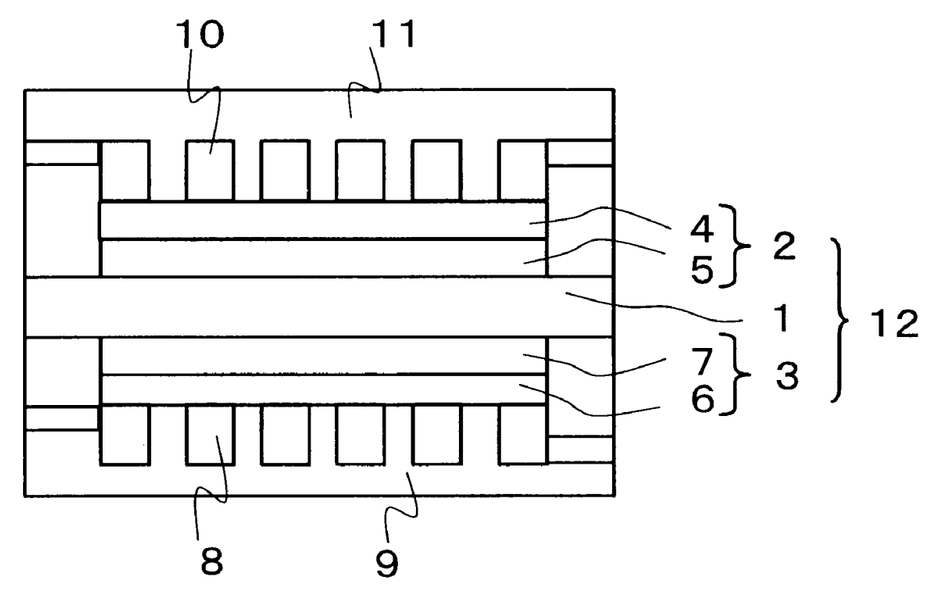
FIG. 1 is a typical side view of a fuel cell in one embodiment of the present invention.

FIG. 1 is a typical side view of a fuel cell in one embodiment of the present invention.

A membrane electrode assembly 12 shown in FIG. 1 (hereinafter referred to as "MEA") comprises an anode 2, a cathode 3, and a proton conductive film 1. The anode 2 comprises a diffusion layer 4 and an anode catalyst layer 5 stacked on the diffusion layer 4. The cathode 3 comprises a diffusion layer 6 and a cathode catalyst layer 7 stacked on the diffusion layer 6. The anode 2 and the cathode 3 are stacked so that the anode catalyst layer faces the cathode catalyst layer through the proton conductive film 1.

MEA is built into a cathode holder 9 with an oxidizing agent gas supply groove 8 and an anode holder 11 with a fuel supply groove 10 to constitute a unit cell as shown in FIG. 1, and power generation is carried out using the unit cell.

The anode catalyst layer 5 comprises the above supported catalyst, proton conductive inorganic oxide, and proton conductive organic polymer binder. The supported catalyst comprises a catalyst and an electroconductive carrier material.

The anode catalyst layer 5 contains a proton conductive organic polymer binder for binding the supported catalyst and the proton conductive inorganic oxide. The content of the proton conductive organic polymer binder is preferably in the above-defined range from the viewpoint of preventing catalyst deterioration. Binding the supported catalyst and the proton conductive oxide only with the proton conductive organic polymer binder is unsatisfactory, and, in some cases, the formation of the catalyst layer is sometimes difficult. In this case, when the amount of the proton conductive organic polymer binder is increased, catalyst deterioration is possibly accelerated. Accordingly, in order to form a catalyst layer while preventing catalyst deterioration, an aprotic conductive binder may be added. The aprotic conductive binder, however, does not have electron conductivity and proton conductivity. Therefore, the addition of the aprotic conductive binder causes an increase in cell resistance and diffusion resistance of the reactant, possibly leading to lowered power output. For the above reason, the content of the aprotic conductive binder based on the total weight of the catalyst layer is preferably 0 to 10% by weight, more preferably 0 to 5% by weight. Aprotic conductive binders include polytetrafluoroethylenes (PTFEs) and ethylene tetrafluoride-propylene hexafluoride copolymer resins (FEPs), and ethylene tetrafluoride-perfluoroalkyl vinyl ether copolymer resins (PFAs).

The cathode catalyst layer 10 comprises a cathode catalyst and a proton conductive binder. The cathode catalyst may be formed of, for example, platinum. The catalyst may be supported on a carrier or alternatively may be used in a nonsupported form.

An electroconductive porous sheet may be used in the diffusion layers 7 and 9. The electroconductive porous sheet may be a sheet formed of a material having air permeability or liquid permeability, for example, a carbon cloth or a carbon paper.

The anode and cathode may be produced by a conventional method. For example, a catalyst layer is formed by mixing and dispersing the above constituent materials in water or an organic solvent such as alcohol to prepare a catalyst slurry, coating the slurry onto the electroconductive porous sheet, drying the coating, and, if necessary, firing the dried coating. The dispersion may be carried out by any method without particular limitation, and examples of such methods include a method using a dissolver and a method using a ball mill.

The electrolyte membrane may be joined to the electrode by an apparatus which can conduct heating and/or pressure application. In general, a hot pressing machine is used. In this case, the pressing is carried out at a temperature at or above the glass transition temperature of a hydrophilic polymer used as a binder in the electrode and electrolyte membrane, and the pressing temperature is generally 100 to 400° C. The pressing pressure varies depending upon the hardness of the electrode but is generally 5 to 200 kg/cm².

The fuel cell in an embodiment of the present invention comprises the above MEA, means for supplying a fuel to the anode, and means for supplying an oxidizing agent to the cathode. A single MEA may be used. Alternatively, a plurality of MEAs may be used. The use of a plurality of MEAs can provide higher electromotive force. Fuels usable herein include methanol and, further, ethanol, formic acid, or an aqueous solution containing at least one of them.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Embodiments of the present invention will be further described by the following Examples which are specific but not limitative of the present invention.

Example 1

A supported catalyst was synthesized. A carbon black carrier (tradename: Vulcan XC72; specific surface area: about 230 m²/g; manufactured by Cabot Corporation) was first satisfactorily dispersed. Next, the dispersed carrier was placed in a holder provided in a chamber within an ion beam sputtering apparatus. When the degree of vacuum reached not more than 3×10⁻⁶ Torr, argon (Ar) gas was allowed to flow thereinto. Sputtering was carried out using metals or alloys provided as a target so as to provide various compositions shown in Table 1 while stirring the carrier kept at a temperature of 50° C. to adhere catalyst fine particles having an average particle diameter of 3 nm onto the carrier. The assemblies were subjected to acid pickling with an aqueous sulfuric acid solution (100 g of sulfuric acid and 200 g of water), were then washed with water, and were dried.

A proton conductive oxide was then synthesized. Vanadium oxide $V_2O_5$ (1 g) was dissolved in 100 mL of aqueous ammonia to prepare a solution. Silicon oxide $SiO_2$ (6.5 g) was dispersed in 300 mL of distilled water, and the dispersion was mixed with the vanadium-containing solution. The mixed solution was heated to 80° C. while always stirring the mixed solution to remove water at an evaporation rate of 100 mL/hr. Thereafter, the residue was further held in a drier of 100° C. for 12 hr to prepare powder. The powder was ground in an agate mortar, was then heated in an alumina crucible at a temperature rise rate of 100° C./hr to 500° C., and was held at 500° C. for 4 hr to produce a vanadium oxide-supported silicon oxide having an element ratio of vanadium element (X) in vanadium oxide to silicon element (Y) in silicon oxide, i.e., X/Y, of 0.1 and having a specific surface area of 50 m²/cm². The element ratio (X/Y) in the proton conductive inorganic material powder was measured by inductively coupled plasma atomic emission spectrometry (ICP-AES), and the specific surface area was measured by a BET method. The vanadium oxide-supported silicon oxide was measured by X-ray diffractometry. As a result, it could be confirmed that all the diffraction peaks were attributable to silicon oxide and vanadium oxide had an amorphous structure. The acidity was measured with an acid indicator or by an ammonia thermal desorption (TPD) method. The results are shown in Table 1.

Next, an anode was prepared using the supported catalyst and proton conductive oxide thus obtained. The supported catalyst (5 g), 1 g of the proton conductive oxide, 1.25 g of a 20% Nafion solution, 0.2 g of a 54% ethylene tetrafluoride-propylene hexafluoride copolymer resin (FEP) solution, 10 g of water, and 10 g of 2-ethoxyethanol were stirred thoroughly and dispersed to prepare a slurry. The slurry was coated with a control coater onto a carbon paper subjected to water repellent treatment (350 μm, manufactured by Toray Industries, Inc.), and the coated carbon paper was dried to prepare an anode electrode having a noble metal catalyst loading density of 1 mg/cm². The weight ratio between the supported catalyst (C) and the proton conductive inorganic oxide (SA), $W_{SA}/W_C$, and the weight ratio between the proton conductive inorganic oxide (SA) and the proton conductive organic polymer binder (P), $W_P/W_{SA}$, were as shown in Table 1.

Example 2

A supported catalyst was synthesized in the same manner as in Example 1, except that an aqueous solution of 0.7 g of boric acid $H_3BO_3$ dissolved in 100 mL of water was used instead of the solution of 1 g of vanadium oxide $V_2O_5$ dissolved in 100 mL of aqueous ammonia and 15 g of niobium oxide $Nb_2O_3$ was used instead of 6.5 g of silicon oxide $SiO_2$. Thus, niobium oxide on which boron oxide as a proton conductive oxide had been supported, having an element ratio between boron element (X) in boron oxide and niobium element (Y) in niobium oxide, i.e., X/Y, of 0.1 and having a specific surface area of 51 m²/cm² was produced. An anode was then produced in the same manner as in Example 1, except that the supported catalyst and proton conductive oxide thus obtained were used.

Example 3

A supported catalyst was synthesized in the same manner as in Example 1, except that a solution of 2.5 g of tungsten oxide $WO_3$ dissolved in 100 mL of aqueous ammonia was used instead of the solution of 1 g of vanadium oxide $V_2O_5$ dissolved in 100 mL of aqueous ammonia, 9 g of titanium oxide $TiO_2$ was used instead of 6.5 g of silicon oxide $SiO_2$, and the baking temperature was changed from 500° C. to 700° C. Thus, titanium oxide on which tungsten oxide as a proton conductive oxide had been supported, having an element ratio between tungsten element (X) in tungsten oxide and titanium element (Y) in titanium oxide, i.e., X/Y, of 0.1 and having a specific surface area of 55 m²/cm² was produced. An anode was then produced in the same manner as in Example 1, except that the supported catalyst and proton conductive oxide thus obtained were used.

Example 4

A supported catalyst was synthesized in the same manner as in Example 1, except that an aqueous solution of 0.7 g of boric acid $H_3BO_3$ dissolved in 100 mL of water was used instead of the solution of 1 g of vanadium oxide $V_2O_5$ dissolved in 100 mL of aqueous ammonia and 19 g of cerium oxide $CeO_2$ was used instead of 6.5 g of silicon oxide $SiO_2$. Thus, cerium oxide on which boron oxide as a proton conductive oxide had been supported, having an element ratio between boron element (X) in boron oxide and cerium element (Y) in cerium oxide, i.e., X/Y, of 0.1 and having a specific surface area of 52 m²/cm² was produced. An anode was then produced in the same manner as in Example 1, except that the supported catalyst and proton conductive oxide thus obtained were used.

Example 5

A supported catalyst was synthesized in the same manner as in Example 1, except that a solution of 2.5 g of tungsten oxide $WO_3$ dissolved in 100 mL of aqueous ammonia was used instead of the solution of 1 g of vanadium oxide $V_2O_5$ dissolved in 100 mL of aqueous ammonia, 13 g of zirconium oxide $ZrO_2$ was used instead of 6.5 g of silicon oxide $SiO_2$, and the baking temperature was changed from 500° C. to 700° C. Thus, titanium oxide on which tungsten oxide as a proton conductive oxide had been supported, having an element ratio between tungsten element (X) in tungsten oxide and zirconium element (Y) in zirconium oxide, i.e., X/Y, of 0.1 and having a specific surface area of 53 m²/cm² was produced. An anode was then produced in the same manner as in Example 1, except that the supported catalyst and proton conductive oxide thus obtained were used.

Example 6

A supported catalyst was synthesized in the same manner as in Example 1, except that a solution of 3 g of chromium chloride hexahydrate $CrCl_3.6H_2O$ dissolved in 100 mL of water was used instead of the solution of 1 g of vanadium oxide $V_2O_5$ dissolved in 100 mL of aqueous ammonia, 15 g of indium oxide $In_2O_3$ was used instead of 6.5 g of silicon oxide $SiO_2$, and the baking temperature was changed from 500° C. to 700° C. Thus, indium oxide on which chromium oxide as a proton conductive oxide had been supported, having an element ratio between chromium element (X) in chromium oxide and indium element (Y) in indium oxide, i.e., X/Y, of 0.1 and having a specific surface area of 49 $m^2/cm^2$ was produced. An anode was then produced in the same manner as in Example 1, except that the supported catalyst and proton conductive oxide thus obtained were used.

Example 7

A supported catalyst was synthesized in the same manner as in Example 1, except that a solution of 2 g of ammonium molybdate $(NH_4)_6Mo_7O_{24}.4H_2O$ dissolved in 100 mL of water was used instead of the solution of 1 g of vanadium oxide $V_2O_5$ dissolved in 100 mL of aqueous ammonia, 13 g of zirconium oxide $ZrO_2$ was used instead of 6.5 g of silicon oxide $SiO_2$, and the baking temperature was changed from 500° C. to 700° C. Thus, zirconium oxide on which molybdenum oxide as a proton conductive oxide had been supported, having an element ratio between molybdenum element (X) in molybdenum oxide and zirconium element (Y) in zirconium oxide, i.e., X/Y, of 0.1 and having a specific surface area of 54 $m^2/cm^2$ was produced. An anode was then produced in the same manner as in Example 1, except that the supported catalyst and proton conductive oxide thus obtained were used.

Example 8

A supported catalyst was synthesized in the same manner as in Example 1, except that 23 g of hafnium oxide $HfO_2$ was used instead of 6.5 g of silicon oxide $SiO_2$. Thus, hafnium oxide on which vanadium oxide as a proton conductive oxide had been supported, having an element ratio between vanadium element (X) in vanadium oxide and hafnium element (Y) in hafnium oxide, i.e., X/Y, of 0.1 and having a specific surface area of 51 $m^2/cm^2$ was produced. An anode was then produced in the same manner as in Example 1, except that the supported catalyst and proton conductive oxide thus obtained were used.

Example 9

A supported catalyst was synthesized in the same manner as in Example 1, except that a solution of 2 g of ammonium molybdate $(NH_4)_6Mo_7O_{24}.4H_2O$ dissolved in 100 mL of water was used instead of the solution of 1 g of vanadium oxide $V_2O_5$ dissolved in 100 mL of aqueous ammonia, 9 g of titanium oxide $TiO_2$ was used instead of 6.5 g of silicon oxide $SiO_2$, and the baking temperature was changed from 500° C. to 700° C. Thus, titanium oxide on which molybdenum oxide as a proton conductive oxide had been supported, having an element ratio between molybdenum element (X) in molybdenum oxide and titanium element (Y) in titanium oxide, i.e., X/Y, of 0.1 and having a specific surface area of 49 $m^2/cm^2$ was produced. An anode was then produced in the same manner as in Example 1, except that the supported catalyst and proton conductive oxide thus obtained were used.

Example 10

A supported catalyst was synthesized in the same manner as in Example 1, except that a solution of 3 g of chromium chloride hexahydrate $CrCl_3.6H_2O$ dissolved in 100 mL of water was used instead of the solution of 1 g of vanadium oxide $V_2O_5$ dissolved in 100 mL of aqueous ammonia, 17 g of tin oxide $SnO_2$ was used instead of 6.5 g of silicon oxide $SiO_2$, and the baking temperature was changed from 500° C. to 700° C. Thus, tin oxide on which chromium oxide as a proton conductive oxide had been supported, having an element ratio between chromium element (X) in chromium oxide and tin element (Y) in tin oxide, i.e., X/Y, of 0.1 and having a specific surface area of 50 $m^2/cm^2$ was produced. An anode was then produced in the same manner as in Example 1, except that the supported catalyst and proton conductive oxide thus obtained were used.

Example 11

A supported catalyst and a proton conductive oxide were synthesized in the same manner as in Example 3. In the same manner as in Example 3, a catalyst slurry was prepared followed by the production of an anode, except that the amount of the proton conductive oxide used was changed from 1 g to 0.5 g and the amount of the 20% Nafion solution used was changed from 1.25 g to 0.63 g.

Example 12

A supported catalyst and a proton conductive oxide were synthesized in the same manner as in Example 3. In the same manner as in Example 3, a catalyst slurry was prepared followed by the production of an anode, except that the amount of the proton conductive oxide used was changed from 1 g to 1.5 g and the amount of the 20% Nafion solution used was changed from 1.25 g to 1.88 g.

Example 13

A supported catalyst and a proton conductive oxide were synthesized in the same manner as in Example 5. In the same manner as in Example 5, a catalyst slurry was prepared followed by the production of an anode, except that the amount of the 20% Nafion solution used was changed from 1.25 g to 2.0 g.

Comparative Example 1

A supported catalyst and a proton conductive oxide were synthesized in the same manner as in Example 1. In the same manner as in Example 1, a catalyst slurry was prepared followed by the production of an anode, except that the amount of the 20% Nafion solution used was changed from 1.25 g to 0.33 g.

Comparative Example 2

A supported catalyst and a proton conductive oxide were synthesized in the same manner as in Example 1. In the same manner as in Example 1, a catalyst slurry was prepared followed by the production of an anode, except that the amount of the 20% Nafion solution used was changed from 1.25 g to 10 g.

Comparative Example 3

A supported catalyst and a proton conductive oxide were synthesized in the same manner as in Example 1. In the same manner as in Example 1, a catalyst slurry was prepared followed by the production of an anode, except that the amount of the proton conductive oxide used was changed from 1 g to 0.2 g and the amount of the 20% Nafion solution used was changed from 1.25 g to 0.25 g.

Comparative Example 4

A supported catalyst and a proton conductive oxide were synthesized in the same manner as in Example 1. In the same manner as in Example 1, a catalyst slurry was prepared followed by the production of an anode, except that the amount of the proton conductive oxide used was changed from 1 g to 2.5 g and the amount of the 20% Nafion solution used was changed from 1.25 g to 3.13 g.

Comparative Example 5

A supported catalyst was synthesized in the same manner as in Example 1. At the outset, 3 g of a supported catalyst, 8 g of pure water, 15 g of a 20% Nafion solution, and 30 g of 2-ethoxyethanol, were thoroughly stirred for dispersion to prepare a slurry. The slurry was coated by a control coater onto a carbon paper subjected to water repellent treatment (350 μm, manufactured by Toray Industries, Inc.), and the coated carbon paper was dried to produce an anode electrode of which the noble metal catalyst loading density was 1 mg/cm$^2$.

Comparative Example 6

A supported catalyst and a proton conductive oxide were synthesized in the same manner as in Example 5. In the same manner as in Example 5, a catalyst slurry was prepared followed by the production of an anode, except that the amount of the 20% Nafion solution used was changed from 1.25 g to 0.5 g.

XPS measurement was carried out for the above various catalysts with Quantum-2000 (tradename, manufactured by ULVAC-PHI, INC). A neutralization gun (an electron gun, an argon gun) was used for charge-up compensation and electrification correction (C1s:C—C=284.6 eV). It was found that the area of the metallic bond-derived peak of each main element T on an XPS spectrum for Examples 1 to 4 and 11 to 14 and Comparative Example 1 was not less than 50% and not less than 20% of the area of the oxygen bond-derived peak area of element T. Further, it was found that the area of the metallic bond-derived peak area of each main element M on an XPS spectrum for Examples 5 to 10 was not less than 50% and not less than 20% of the area of the oxygen bond-derived peak of element M. The main element T refers to element T having the highest content when a plurality of types of elements T are contained in the catalyst fine particle. When a plurality of types of elements M are contained in the catalyst fine particle, the main element M refers to element M having the highest content. For example, for catalyst fine particles of Example 4, main element M is vanadium. Specifically, for vanadium element, the metallic bond component and the oxidative bond component were separated from peaks of a binding energy in the range of 512 to 514 eV and a binding energy in the range of 516 to 518 eV in a V2p spectrum. For hafnium element, the metallic bond component and the oxidative bond component were separated from peaks of a binding energy in the range of 13 to 16 eV and a binding energy in the range of 16 to 17 eV in a Hf4f spectrum. For niobium element, the metallic bond component and the oxidative bond component were separated from peaks of a binding energy in the range of 202 to 205 eV and a binding energy in the range of 203 to 209 eV in an Nb3d spectrum. For tungsten element, the metallic bond component and the oxidative bond component were separated from peaks of a binding energy in the range of 30 to 33 eV and a binding energy in the range of 33 to 36 eV in a W4f spectrum. When the oxygen bond-derived peak area was presumed to be 100%, the metallic bond-derived peak area was as shown in Table 1 below.

The supported catalysts of Examples 1 to 10 and Comparative Example 1 were analyzed by XRD (X-ray diffractometry). As a result, it was found that the spacing between crystal faces in a main peak in the diffraction pattern was in the range of 2.16 to 2.25 angstroms.

The average particle diameter of catalyst fine particles in each supported catalyst was determined by observation under TEM (transmission electron microscope) for five arbitrary different visual fields. In this case, for each visual field, the diameters of 20 particles were measured, and the diameters of 100 particles in total were averaged to determine the average particle diameter. As a result, the average particle diameter of each supported catalyst particle was 3 nm.

A standard cathode (carbon black supported platinum catalyst, manufactured by Tanaka Kikinzoku Kogyo K.K.) was used as a cathode in combination with the anode for each Example. A fuel cell electrode, a membrane electrode assembly, and a unit cell were produced by the following methods and were then evaluated.

<Cathode>

At the outset, 2 g of a platinum catalyst was weighed. The platinum catalyst, together with 5 g of pure water, 5 g of a 20% Nafion solution, and 20 g of 2-ethoxyethanol, were thoroughly stirred for dispersion to prepare a slurry. The slurry was coated by a control coater onto a carbon paper subjected to water repellent treatment (350 μm, manufactured by Toray Industries, Inc.), and the coated carbon paper was dried to produce a cathode of which the noble metal catalyst loading density was 2 mg/cm$^2$.

<Production of Membrane Electrode Assembly>

The anode and the cathode were cut into a size of 3.2×3.2 cm square so that the electrode area of each of the anode and the cathode was 10 cm$^2$. Nafion 117 (manufactured by Du Pont Ltd.) was held as a proton conductive organic polymer film between the cathode and the anode, followed by thermocompression bonding under conditions of temperature 125° C., time 10 min, and pressure 30 kg/cm$^2$ to produce a membrane electrode assembly.

A unit cell in a fuel direct supply-type solid polymer electrolyte fuel cell was produced using the membrane electrode assembly and a flow passage plate. Power generation was carried out at a current density of 150 mA/cm$^2$ in such a state that a 1 M aqueous methanol solution as a fuel was supplied into the unit cell in its anode at a flow rate of 0.6 mL/min, air was supplied into the cathode at a flow rate of 200 mL/min, and the cell was maintained at 65° C. Thirty min after the start of power generation, the cell voltage was measured. The results are also shown in Table 1.

Finally, the long-term stability of the catalyst was determined by measuring the voltage 1000 hr after the start of power generation for each MEA and calculating the following defined percentage deterioration. The results are shown in Table 1.

Deterioration(%)=(Initial voltage−Voltage after 1000 hr)×100/initial voltage

TABLE 1

| | Catalyst | Peak area ratio, % | Proton conductive oxide (SA) | | Acidity function $H_0$ | $W_{SA}/W_C$ | $W_P/W_{SA}$ | Voltage, V | 1000-hr deterioration, % |
| --- | --- | --- | --- | --- | --- | --- | --- | --- | --- |
| | | | Oxide A Element X | Element Y-containing oxide B | | | | | |
| Ex. 1 | $Pt_{40}Ru_{40}V_{20}$ | 50 | V | $SiO_2$ | −11.99 | 0.2 | 0.25 | 0.48 | 0.50 |
| Ex. 2 | $Pt_{50}Ru_{30}Hf_{20}$ | 20 | B | $Nb_2O_3$ | −13.16 | 0.2 | 0.25 | 0.47 | 0.50 |
| Ex. 3 | $Pt_{50}Ru_{30}Nb_{20}$ | 25 | W | $TiO_2$ | −13.16 | 0.2 | 0.25 | 0.46 | 0.50 |
| Ex. 4 | $Pt_{45}Ru_{35}V_{15}W_5$ | 30 | B | $CeO_2$ | −14.52 | 0.2 | 0.25 | 0.49 | 0.50 |
| Ex. 5 | $Pt_{50}Ru_{26}Sn_6W_{18}$ | 70 | W | $ZrO_2$ | −14.50 | 0.2 | 0.25 | 0.50 | 0.50 |
| Ex. 6 | $Pt_{45}Ru_{35}Sn_6V_{14}$ | 30 | Cr | $In_2O_3$ | 12.40 | 0.2 | 0.25 | 0.52 | 0.50 |
| Ex. 7 | $Pt_{45}Ru_{30}Rh_8V_{10}Sn_7$ | 50 | Mo | $ZrO_2$ | −14.50 | 0.2 | 0.25 | 0.53 | 0.50 |
| Ex. 8 | $Pt_{45}Ru_{30}Os_{10}V_{10}Sn_5$ | 60 | V | $HfO_2$ | −13.75 | 0.2 | 0.25 | 0.52 | 0.50 |
| Ex. 9 | $Pt_{30}Ru_{22}W_{35}Sn_8Mo_5$ | 60 | Mo | $TiO_2$ | −13.16 | 0.2 | 0.25 | 0.50 | 0.50 |
| Ex. 10 | $Pt_{30}Ru_{20}Os_{10}Ti_5W_{25}Sn_{10}$ | 50 | Cr | $SnO_2$ | −15.00 | 0.2 | 0.25 | 0.49 | 0.50 |
| Ex. 11 | $Pt_{50}Ru_{30}Nb_{20}$ | 25 | W | $TiO_2$ | −13.16 | 0.1 | 0.25 | 0.46 | 0.52 |
| Ex. 12 | $Pt_{50}Ru_{30}Nb_{20}$ | 25 | W | $TiO_2$ | −13.16 | 0.3 | 0.25 | 0.46 | 0.48 |
| Ex. 13 | $Pt_{50}Ru_{26}Sn_6W_{18}$ | 70 | W | $ZrO_2$ | −14.50 | 0.2 | 0.4 | 0.52 | 0.50 |
| Comp. Ex. 1 | $Pt_{40}Ru_{40}V_{20}$ | 50 | V | $SiO_2$ | −11.99 | 0.2 | 0.07 | 0.38 | 0.50 |
| Comp. Ex. 2 | $Pt_{40}Ru_{40}V_{20}$ | 50 | V | $SiO_2$ | −11.99 | 0.2 | 2 | 0.48 | 2 |
| Comp. Ex. 3 | $Pt_{40}Ru_{40}V_{20}$ | 50 | V | $SiO_2$ | −11.99 | 0.04 | 0.25 | 0.25 | 0.70 |
| Comp. Ex. 4 | $Pt_{40}Ru_{40}V_{20}$ | 50 | V | $SiO_2$ | −11.99 | 0.5 | 0.25 | 0.38 | 0.50 |
| Comp. Ex. 5 | $Pt_{40}Ru_{40}V_{20}$ | 50 | — | — | — | — | — | 0.48 | 3 |
| Comp. Ex. 6 | $Pt_{50}Ru_{26}Sn_6W_{18}$ | 70 | W | $ZrO_2$ | −14.50 | 0.2 | 0.1 | 0.46 | 0.50 |

As is apparent from the results shown in Table 1, comparison of Example 1 with Comparative Example 5 shows that, for MEA (Comparative Example 5) including an anode comprising a supported catalyst and a proton conductive organic polymer binder, the percentage deterioration after 1000-hr operation was 3%, whereas, for MEA (Example 1) including an anode comprising a supported catalyst, a proton conductive organic polymer binder, and further a proton conductive oxide, the percentage deterioration after 1000-hr operation was low and 0.50% without sacrificing the cell voltage. For Examples 1 to 14, it is apparent that, even when any supported catalyst is used, for MEA including an anode comprising a proton conductive oxide and a proton conductive organic polymer binder, the percentage deterioration after 1000-hr operation was low and 0.48 to 0.52%.

Comparison of Example 1 with Comparative Examples 1 and 2 shows that the cell voltage or the percentage deterioration after 1000-hr operation for Example 1 is better than that for Comparative Example 1 or 2 in which the weight ratio between the proton conductive inorganic oxide (SA) and the proton conductive organic polymer binder (P), i.e., $W_P/W_{SA}$, is outside the range of 0.125 to 0.5.

Comparison of Example 1 with Comparative Examples 3 and 4 shows that the cell voltage for Example 1 is better than that for Comparative Example 3 or 4 in which the weight ratio between the supported catalyst (C) and the proton conductive inorganic oxide (SA), i.e., $W_{SA}/W_C$, is outside the range of 0.06 to 0.38.

As described above, the present invention can provide fuel cells which can suppress a catalyst deterioration and are stable for a long period of time.

The present invention is not limited to the above embodiments only. In practicing the invention, structural elements may be modified and embodied without departing from the spirit of the invention. A plurality of structural elements disclosed in the embodiments may be properly combined to constitute various inventions. For example, some of structural elements may be omitted from all the structural elements in the embodiments. Further, structural elements in different embodiments may be properly combined.

The invention claimed is:

1. An anode comprising an electrode catalyst layer, the electrode catalyst layer comprising:
   a supported catalyst comprising an electroconductive carrier material and catalyst fine particles supported on the electroconductive carrier material;
   a proton conductive inorganic oxide; and
   a proton conductive organic polymer binder;
   the weight ratio between the supported catalyst (C) and the proton conductive inorganic oxide (SA), $W_{SA}/W_C$, being 0.06 to 0.38,
   the weight ratio between the proton conductive inorganic oxide (SA) and the proton conductive organic polymer binder (P), $W_P/W_{SA}$, being 0.125 to 0.5.

2. The anode according to claim 1, wherein the catalyst fine particle has a composition represented by formula (1), and the area of a peak attributable to a metallic bond of element T in a spectrum measured by X-ray photoelectron spectroscopy is not less than 20% of the area of a peak attributable to an oxygen bond of element T:

$$Pt_xRu_yT_z \qquad (1)$$

wherein element T is at least one element selected from the group consisting of vanadium (V), niobium (Nb), and hafnium (Hf); and x is 30 to 60 at.%, y is 20 to 50 at.%, and z is 5 to 50 at.%.

3. The anode according to claim 2, wherein z is 10 to 35 at.%.

4. The anode according to claim 2, wherein the catalyst fine particle further comprises at least one noble metal element selected from the group consisting of rhodium (Rh), osmium (Os), and iridium (Ir).

5. The anode according to claim 2, wherein the catalyst fine particle further comprises at least one metal element selected from the group consisting of tungsten (W), nickel (Ni), molybdenum (Mo), tantalum (Ta), titanium (Ti), zirconium (Zr), chromium (Cr), and cobalt (Co).

6. The anode according to claim 1, wherein the catalyst fine particle has a composition represented by formula (2), and the area of a peak attributable to a metallic bond of element M in a spectrum measured by X-ray photoelectron spectroscopy is not less than 20% of the area of a peak attributable to an oxygen bond of element M:

$$Pt_xRu_yM_zSn_u \qquad (2)$$

wherein element M is at least one element selected from the group consisting of vanadium (V), niobium (Nb), hafnium (Hf), and tungsten (W); and x is 30 to 60 at.%, y is 20 to 50 at.%, z is 5 to 50 at.%, and u is 0.5 to 12 at.%.

7. The anode according to claim 6, wherein u is 1 to 10 at.%.

8. The anode according to claim 6, wherein the catalyst fine particle further comprises at least one noble metal element selected from the group consisting of rhodium (Rh), osmium (Os), and iridium (Ir).

9. The anode according to claim 6, wherein the catalyst fine particle further comprises at least one metal element selected from the group consisting of molybdenum (Mo), tantalum (Ta), titanium (Ti), zirconium (Zr), chromium (Cr), and cobalt (Co).

10. The anode according to claim 1, wherein the average particle diameter of the catalyst fine particles is not more than 10 nm.

11. The anode according to claim 1, wherein the spacing between a plurality of crystal faces, which exhibit a main peak in an X-ray diffraction pattern of the catalyst fine particles, is 2.16 to 2.25 angstroms.

12. The anode according to claim 1, wherein the proton conductive organic polymer binder contains a sulfonic acid group.

13. The anode according to claim 1, wherein the proton conductive inorganic oxide comprises an oxide carrier containing at least one element Y selected from the group consisting of titanium (Ti), zirconium (Zr), silicon (Si), aluminum (Al), tin (Sn), hafnium (Hf), germanium (Ge), gallium (Ga), indium (In), cerium (Ce), and niobium (Nb), and an oxide particle containing at least one element X selected from the group consisting of tungsten (W), molybdenum (Mo), chromium (Cr), boron (B), and vanadium (V) and supported on the surface of the oxide carrier.

14. The anode according to claim 1, wherein the proton conductive inorganic oxide has a Hammett acidity function $H_o$ satisfying $$-20.00 < H_o < -11.93.$$

15. The anode according to claim 1, wherein the supported catalyst comprises the catalyst fine particles which have been provided on the electroconductive carrier held at a temperature of 400° C. or below by sputtering or vapor deposition.

16. A membrane electrode assembly comprising a fuel electrode, an oxidizing agent electrode, and an electrolyte membrane disposed between the fuel electrode and the oxidizing agent electrode, wherein
the fuel electrode comprises a catalyst layer, and the catalyst layer comprises:
a supported catalyst comprising an electroconductive carrier material and catalyst fine particles supported on the electroconductive carrier material;
a proton conductive inorganic oxide; and
a proton conductive organic polymer binder;
the weight ratio between the supported catalyst (C) and the proton conductive inorganic oxide (SA), $W_{SA}/W_C$, being 0.06 to 0.38,
the weight ratio between the proton conductive inorganic oxide (SA) and the proton conductive organic polymer binder (P), $W_{P/WSA}$, being 0.125 to 0.5.

17. A fuel cell comprising a fuel electrode, an oxidizing agent electrode, and an electrolyte membrane disposed between the fuel electrode and the oxidizing agent electrode, wherein
the fuel electrode comprises a catalyst layer, and the catalyst layer comprises:
a supported catalyst comprising an electroconductive carrier material and catalyst fine particles supported on the electroconductive carrier material;
a proton conductive inorganic oxide; and
a proton conductive organic polymer binder;
the weight ratio between the supported catalyst (C) and the proton conductive inorganic oxide (SA), $W_{SA}/W_C$, being 0.06 to 0.38,
the weight ratio between the proton conductive inorganic oxide (SA) and the proton conductive organic polymer binder (P), $W_{P/WSA}$, being 0.125 to 0.5.

18. A fuel cell comprising the anode of claim 1.

* * * * *